June 28, 1949.　　　　H. C. SCHWABE　　　　2,474,498
FISHING FLOAT
Filed Nov. 18, 1947
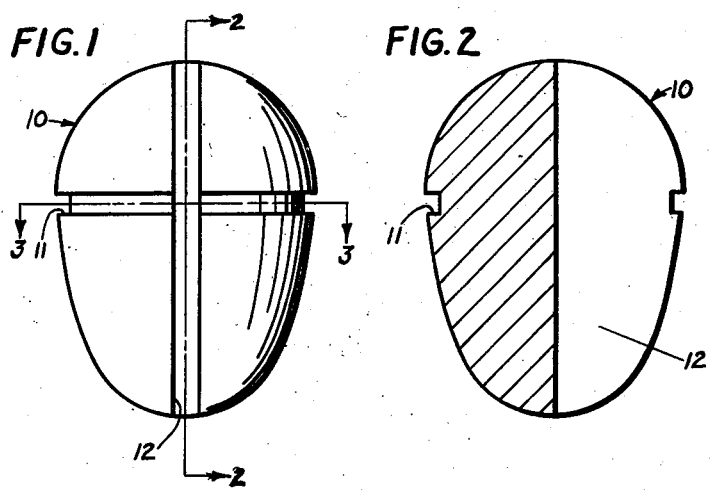
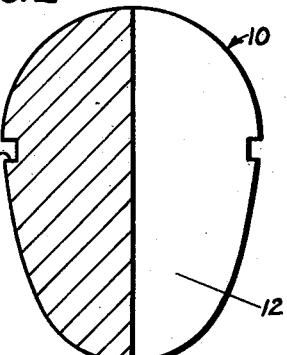
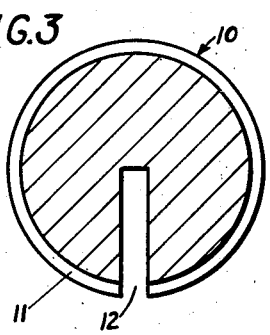
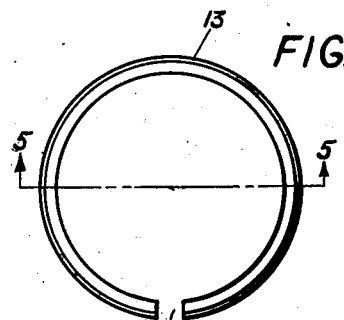
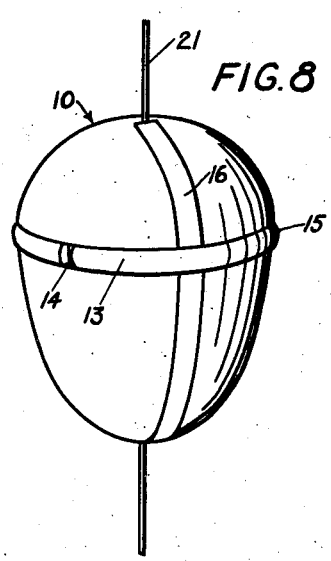
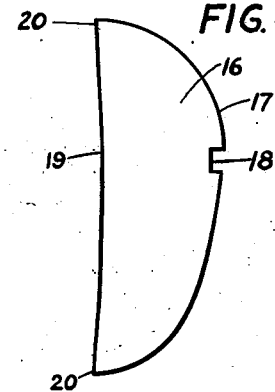
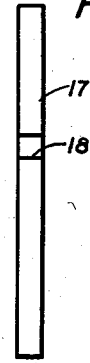
INVENTOR.
HAROLD C. SCHWABE
BY
McMorrow, Berman & Davidson
Attorneys Patented June 28, 1949

2,474,498

UNITED STATES PATENT OFFICE 2,474,498

FISHING FLOAT

Harold C. Schwabe, Shawano, Wis.

Application November 18, 1947, Serial No. 786,611

3 Claims. (Cl. 43—49)

This invention relates to improvements in fishing floats and more particularly to a non-tangling bobber or float which may easily be applied to a fish line and arranged to grip the line and readily and quickly be adjusted therealong.

The advantages and further objects of my invention will appear in the following specification supplemented by the accompanying drawings illustrating a highly satisfactory preferred embodiment of my invention.

In the drawings:

Figure 1 is an elevation view of a float body in accordance with my invention.

Figure 2 is a sectional view thereof taken on line 2—2 of Figure 1.

Figure 3 is a sectional view thereof taken on line 3—3 of Figure 1.

Figure 4 is a plan view of a slotted ring member for the float.

Figure 5 is a sectional view thereof taken on line 5—5 of Figure 4.

Figure 6 is a side elevation of a key element for the float.

Figure 7 is an edge elevation thereof, and

Figure 8 is a perspective view of the float element assembled on a fish line.

The float in accordance with my invention in its preferred form comprises a body 10 of general oval shape of any desired material that will float and will not become waterlogged or corroded. Body 10 has a horizontal annular ring receiving slot 11 surrounding the same axis and a longitudinal vertical slot 12 extending along its major vertical axis of the float body and extending outwardly through a side of the body as fully illustrated in Figures 1, 2 and 3.

An annular ring 13 preferably of spring brass and having ends thereof spaced to provide a slot 14 therebetween of a width equal to the width of slot 12 is positioned in annular slot 11 with its slot 14 coinciding with slot 12. Being of spring material ring 13 frictionally grips body 10 in the slot 11 and its outer peripheral surface 15 is curved to bulge outwardly of slot 11 so as to provide a finger grip for turning the ring in said slot 11.

A line gripping key 16 which has the same contour as slot 12 provides a filler for slot 12. Its outer contour is the same as that of the float body 10 having a slot 18 therein corresponding with annular slot 11 and its inner edge 19 for fitting the back wall of slot 12 is preferably slightly curved providing upper and lower edges 20 which will firmly engage a fishing line 21 when it is assembled in float body 10 as shown in Figure 8.

Thus with slot 14 of ring 13 coinciding with slot 12, key 16 may be inserted to grip the fish line 21 and then ring 13 is turned on body 10 so that slot 14 no longer coincides with slot 12—a turn of 90° or even 180° if desired—and in this position it applies spring pressure on key 16 so that fish line 21 is firmly gripped within the float body 10 and no lines extend lengthwise over the exterior surface of the float to tangle. By merely turning ring 13 to loosen key 16 and line 21 the float may be adjusted up or down on the line.

Having described a preferred highly satisfactory embodiment of my invention what I claim as new and desire to secure by Letters Patent is:

1. A fishing float comprising a float body having an annular slot surrounding the same and a vertical slot extending alog the major vertical axis of the float body and outwardly through the side surface of the float body and lengthwise thereof for receiving a fishing line inserted laterally therein, a key having the same general contour as said longitudinal slot and adapted to be received within the slot to engage the fishing line, and having an outer slot coinciding with said annular slot in the float body, and a slotted ring of spring material positioned in said annular slot and adapted to be rotated therein to apply spring pressure on said key and fishing line engaged thereby.

2. A fishing float comprising a float body of generally ovate formation having an annular slot surrounding the same and a vertical slot extending along the major vertical axis of the float body and outwardly through the side surface of the float body and lengthwise thereof for receiving a fishing line inserted laterally therein, a key having the same general contour as said vertical slot and adapted to be received within the slot to engage the fishing line, and having an outer slot coinciding with said annular slot in the float body, said key having an inner slightly concave edge providing upper and lower edges for engaging the fishing line to insure a tight grip on the line, and a slotted ring of spring material positioned in said annular slot and adapted to be rotated therein to apply spring pressure on said key and fishing line engaged thereby.

3. A fishing float comprising a float body of generally ovate formation having an annular slot surrounding the same and a vertical slot extending along the major vertical axis of the float body and outwardly through the side surface of the float body and lengthwise thereof for receiving a fishing line inserted laterally therein, a key having the same general contour as said vertical slot and adapted to be received within the slot to engage the fishing line, and having an outer slot coinciding with said annular slot in the float body, said key having an inner slightly concave edge providing upper and lower edges for engaging the fishing line to insure a tight grip on the line, and a slotted ring of spring material positioned in said annular slot and adapted to be rotated therein to apply spring pressure on said key and fishing line engaged thereby, said ring having a curved peripheral surface bulging outwardly from the surface of the float body to provide a gripping surface to facilitate turning the ring in said annular slot.

HAROLD C. SCHWABE.

REFERENCES CITED

The following references are of record in the file of this patent:

UNITED STATES PATENTS

| Number | Name | Date |
| --- | --- | --- |
| 327,100 | Palm | Sept. 29, 1885 |
| 581,853 | Eakins | May 4, 1897 |
| 763,557 | Hachmann | June 28, 1904 |